United States Patent [19]

Hooks

[11] Patent Number: 4,736,640

[45] Date of Patent: Apr. 12, 1988

[54] COMPACT SIX-DEGREE-OF-FREEDOM MOTION DETECTING APPARATUS AND ASSOCIATED METHODS

[76] Inventor: Mark M. Hooks, 3111 Whitehall St., Dallas, Tex. 75229

[21] Appl. No.: 896,839

[22] Filed: Aug. 14, 1986

[51] Int. Cl.$^4$ .................................. G01B 13/00
[52] U.S. Cl. ............................ 73/866.1; 74/DIG. 7
[58] Field of Search .................. 73/866.1; 74/DIG. 7

[56] References Cited

U.S. PATENT DOCUMENTS

| | | | |
|---|---|---|---|
| 2,098,099 | 11/1937 | Kahn | 73/866.1 X |
| 2,642,075 | 6/1953 | White | 73/866.1 X |
| 3,229,590 | 1/1966 | Huska | 92/48 |
| 3,420,147 | 1/1969 | Beach | 92/37 |
| 3,573,412 | 4/1971 | Uhrich | 200/329 X |
| 3,776,058 | 12/1973 | French | 74/471 XY |
| 3,918,496 | 11/1975 | Byers, Jr. | 137/636.1 |
| 4,216,467 | 8/1980 | Colston | 340/365 L |
| 4,320,392 | 3/1982 | Giovinazzo et al. | 340/365 C |
| 4,404,991 | 8/1983 | Cullen | 137/636.1 |
| 4,536,746 | 8/1985 | Gobeli | 340/365 A |
| 4,555,960 | 12/1985 | King | 74/471 XY |

*Primary Examiner*—Tom Noland
*Attorney, Agent, or Firm*—Hubbard, Thurman, Turner & Tucker

[57] ABSTRACT

A compact, six-degree-of-freedom motion detecting system includes a hollow spherical motion input member adapted to be grasped by an operator, and a decoupling cube disposed within the motion input member and restrained against appreciable motion by a support shaft extending into the motion input member and secured at its opposite ends to the cube and a rigid base. Six translational motion sensors, each spaced outwardly from one of the cube side surfaces, are disposed within the motion input member and movably mounted on the cube by a support rod system. Each of the sensors includes a central longitudinal section of one of six flexible, fluid-filled tubes, the opposite end portions of each tube being extended outwardly through the motion input member and operatively connected to the inlets of one of six differential pressure transducers. The motion input member is supported for translation and rotation relative to the cube, and with respect to three mutually perpendicular reference axes thereof, by means of six balls, each of which is movably carried in an internally tracked portion of the motion input member and pinches shut one of the central longitudinal tube sections. Operator movement of the input member causes various of the balls to roll along the central tube sections, pinching them shut in altered locations thereon and creating pressure differentials in the tubes which are sensed by the transducers. The transducer outputs are transmitted to a suitable signal processor which responsively generates signals indicative of the magnitude and sense of translation and rotation of the motion input member relative to each of the three cube reference axes.

27 Claims, 6 Drawing Sheets

COMPACT SIX-DEGREE-OF-FREEDOM MOTION DETECTING APPARATUS AND ASSOCIATED METHODS

BACKGROUND OF THE INVENTION

The present invention relates generally to motion detecting apparatus, and more particularly provides a compact hand controller in which all, moving parts of a unique six-degree-of-freedom motion sensing system are positioned within a hollow, spherical hand-held motion input member, the sensing system having an output portion, remote from the spherical member, which generates signals indicative of the magnitude and sense of translation and rotation of the spherical member relative to three mutually perpendicular reference axes.

Conventional motion detecting systems typically comprise an input member (often hand-operable), a sensing system which detects motion of the input member relative to one or more reference axes, and an output system which generates a signal or signals indicative of the sensed motion of the input member. Various of these conventional motion detecting systems are exemplified in U.S. Pat. Nos. 3,229,590; 3,420,147; 3,573,412; 3,776,058; 3,918,496; 4,216,467; 4,320,392; 4,536,746; 4,404,991; and 4,555,960.

This general motion-detecting scheme is incorporated into a number of well known devices such as joy sticks, track balls, the computer "mouse", light or sound pens, arm digitizers and free space digitizers.

Joy sticks are devices used to generate translational motion signals relative to two perpendicular axes by pivoting an elongated rod member around such axes. Some units have the capacity for generating a third motion signal by rotating the rod about its longitudinal axis.

Track balls operate similarly to joy sticks except that the two directional output signals are generated by rotating the ball about two perpendicular axes thereof. Some track ball units have the capability of generating a third direction signal created by rotating the ball about a third axis thereof.

The familiar computer "mouse" is a device in which translational directional signals relative to two perpendicular axes are generated by moving a "puck" around on the flat surface of a sensing table. Light or sound pens are devices similar to the computer mouse except that a "pen" is moved around on a CRT or other flat surface.

The arm digitizer is a device that allows the location of a point in three dimensional space by the use of a series of arms linked to a pointer, an output system generating directional signals which are correlated to the measured angles of the various arms as the pointer is moved.

Free space digitizers are devices in which the position of a pen-like device in three dimensional space is measured by the use of an electro magnetic field created by a coil in the pen, and pickup coils located in a sensing table.

Despite their wide use and acceptance, however, all of the foregoing motion detecting devices have associated therewith certain limitations and disadvantages.

For example, in each of the devices the motion sensing system is usually wholly external to the hand-held motion input member. This separation of the input member and its associated sensing system accordingly increases the necessary overall volume of the particular motion detection system. Additionally, many conventional motion detecting systems utilize rather sophisticated (and therefore relatively costly) electronic circuitry in their motion-sensing systems, or alternatively utilize fairly bulky mechanical linkage mechanisms which are subject to wear-induced inaccuracies.

Further, many of the simpler motion detecting systems, as mentioned above, have only two or three degrees of motion input freedom. Devices like the computer mouse, the light or sound pen, and the free space digitizer can additionally require a considerable amount of table space.

From the foregoing it can be seen that it would be desirable to provide compact motion detecting apparatus and associated methods which eliminate or substantially minimize above-mentioned and other limitations and disadvantages associated with conventional motion detecting systems. Accordingly, it is an object of the present invention to provide such apparatus and methods.

SUMMARY OF THE INVENTION

In carrying out principles of the present invention, in accordance with a preferred embodiment thereof, compact six-degree-of-freedom motion detecting and control apparatus is provided in which the entire motion-sensing system is carried within a hand-operable motion input member of a convenient hollow spherical configuration. The internal motion-sensing system includes a support member in the form of a decoupling cube having three mutually perpendicular reference axes (X—X, Y—Y and Z—Z) each extending transversely through opposite side surfaces of the cube and passing through its centroid. The cube is anchored against appreciable movement by means of an elongated connecting shaft secured at its opposite ends to a corner of the cube and a rigid base member. The spherical input member is mounted on the enveloped cube for translational and rotational motion relative thereto, and with respect to each of the three reference axes, by means of six translational motion sensors movably carried by the cube and movably engaging the interior of the sphere.

Each of the translational motion sensors comprises: a flexible, fluid-filled tube having a central longitudinal section and a pair of reduced diameter end portions; an elongated tube guide having an arcuately cross-sectioned channel which receives a radial portion of the central longitudinal tube section, a translational reference axis extending along the channel, and a pair of end flaps, through which the small diameter tube end portions are exended, that function to retain the central tube section in the channel and prevent its translation along the sensor's references axis; and a motion input portion in the form of a small ball.

The tube guides are coupled in pairs and movably mounted on the cube by means of three pairs of parallel, laterally spaced teflon-sleeved support rods, each of the rod pairs extending between and interconnecting one of the tube guide pairs, and laterally engaging opposite side surfaces of the cube for movement therealong.

The support rods position each of the tube guides outwardly from a different side surface of the cube, with the tube guide channels facing outwardly from the cube and the reference axes of the interconnected sensor pairs being parallel to each other and to one of the three reference axes of the cube. The support rods in each pair thereof are longer than the lateral spacing therebetween so that each coupled sensor pair is restrained from movement parallel to their tranlational reference axes, but is permitted to move in two directions perpendicular thereto, such perpendicular directions being parallel to two of the cube reference axes.

Each of the six balls is movably carried in an interally tracked portion of the sphere and complete pinches shut one of the central tube sections carried in the tube guides, the reduced diameter end portions of each tube being operatively connected to a differential pressure-to-electric transducer located externally of the sphere. Movement of the sphere relative to the internal cube moves one or more of the balls along their associated central tube sections and pinches the tube sections shut at different locations along their lengths, thereby creating pressure differentials within the tubes.

Such pressure differentials cause the transducers to generate output signals indicative of the magnitude and sense of such pressure differentials. The transducer output signals are transmitted to a signal processor which responsively generates signals indicative of the magnitude and sense of the translation and rotation of the sphere relative to the three mutually perpendicular cube reference axes.

According to another aspect of the present invention, spring means are provided for automatically recentering the hand-held sphere relative to the cube when the sphere is released. Additionally, wear-induced lateral play of the sensor support rods relative to the cube is inhibited by play control members resiliently positioned in small grooves formed along the six cube faces, and engaging the support rods.

DETAILED DESCRIPTION

Figure 1:
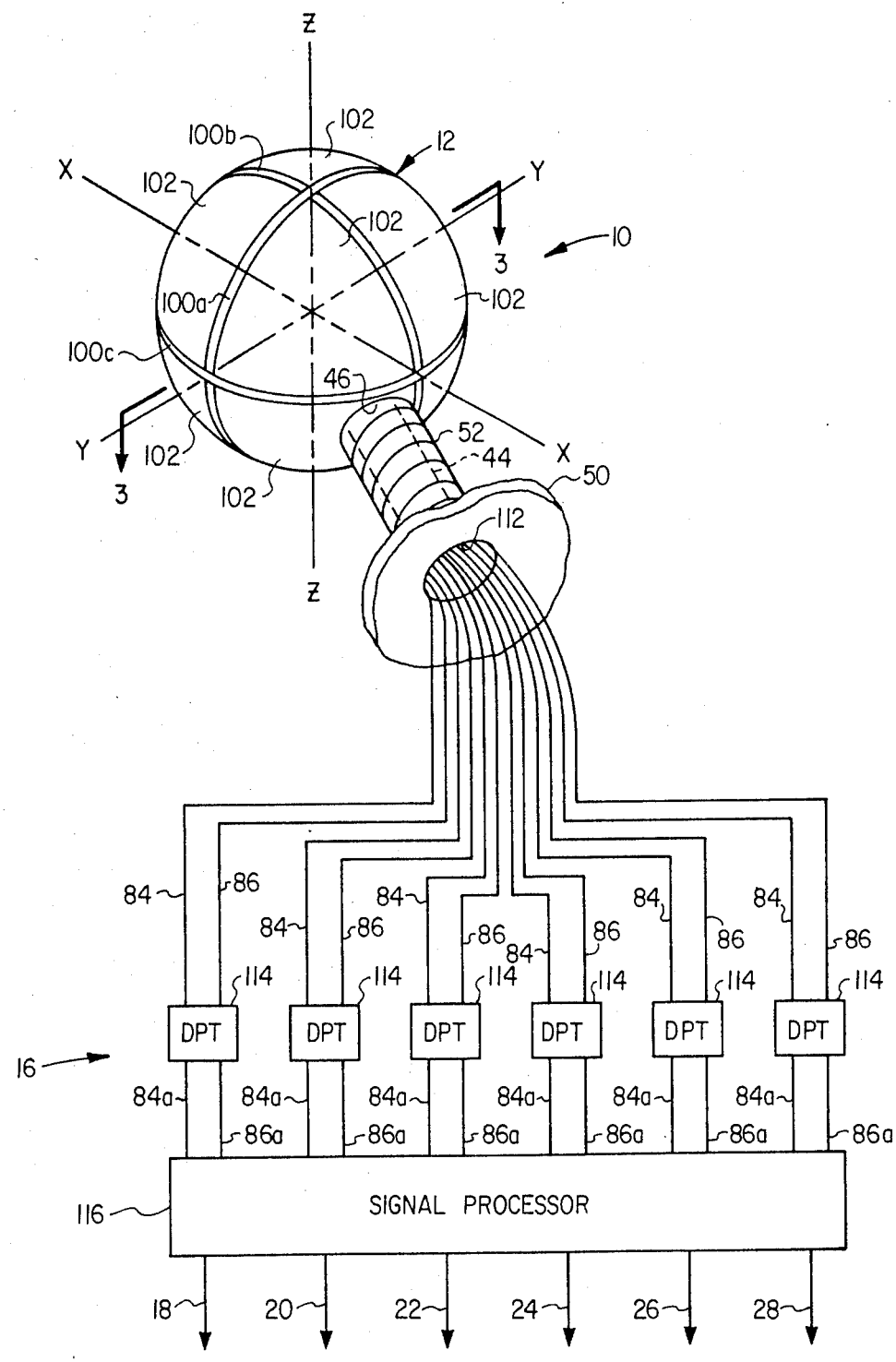
FIG. 1 perspectively illustrates a six-degree-of-freedom motion detection system embodying principles of the present invention, and schematically depicts an output portion of the system which generates output signals indicative of the translation and rotation of a hollow, spherical hand-held motion input member portion of the system relative to three mutually perpendicular reference axes.

Illustrated in FIG. 1 is a six-degree-of-freedom motion detecting system 10 which embodies principles of the present invention and includes a hollow, spherical motion input member 12 which is sized to be easily grasped by an operator, and is translatable and rotatable relative to each of three mutually perpendicular reference axes X—X, Y—Y and Z—Z. Disposed entirely within the sphere 12 is a uniquely configured motion-sensing system 14 (FIGS. 2-4) which senses the translational and rotational motion of sphere 12 and responsively generates, via an output system 16 external to the sphere 12, six output signals 18, 20, 22, 24, 26 and 28. These output signals are respectively indicative of the magnitude and sense of sphere translation relative to the X—X axis, the magnitude and sense of sphere translation relative to the Y—Y axis, the magnitude and sense of sphere translation relative to the Z—Z axis, the magnitude and sense of sphere rotation relative to the X—X axis, the magnitude and sense of sphere rotation relative to the Y—Y axis, and the magnitude and sense of sphere rotation relative to the Z—Z axis.

The motion sensing system 14 disposed within the sphere 12 includes a support member in the form of a machined aluminum decoupling cube 30, the reference axes X—X, Y—Y and Z—Z extending through the cube and intersecting at its centroid. Cube 30 has a pair of oppositely facing side surfaces 32, 34 extending perpendicularly to the reference axis X—X, a pair of oppositely facing side surfaces 36, 38 extending perpendicularly to the reference axis Y—Y, and a pair of oppositely facing upper and lower side surfaces 40, 42 extending perpendicularly to the reference axis Z—Z. The decoupling cube is anchored against appreciable movement by means of an elongated support shaft 44 which extends into the sphere 12 through an oversized opening 46 therein. The inner end of shaft 44 is suitably secured to a champfered lower right hand corner 48 of the cube (FIG. 4), while the outer end of the support shaft is secured to a suitable rigid base 50. Extending between the sphere 12 and the base 50, and circumscribing the support shaft 44, is a flexible tubular trim collar 52 which has an inner diameter somewhat larger than the diameter of the support shaft 44.

Figure 5:
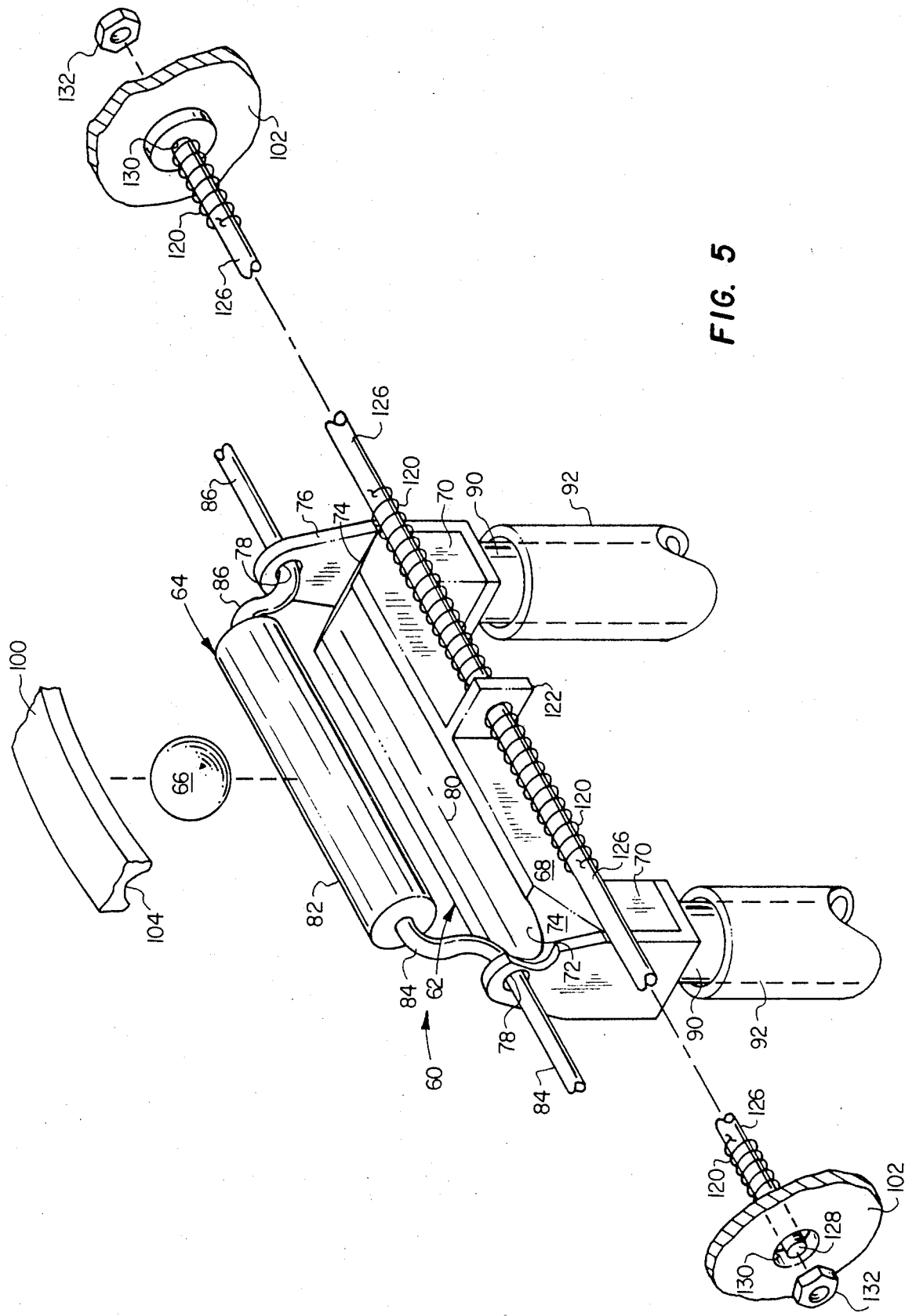
FIG. 5 is an enlarged scale, partially exploded fragmentary perspective view of a translational motion sensor portion of the system, its supporting system, an adjacent section of the spherical member, and a portion of an automatic spherical member centering system.

The sphere 12 is mounted on the decoupling cube 30 for translational and rotational motion relative thereto, and with respect to the reference axes X—X, Y—Y and Z—Z, by means of six translational motion sensors 60 (a representative one of such sensors being illustrated in FIG. 5). Each of the sensors 60 includes an elongated tube guide 62, a flexible, fluid-filled tube or conduit 64, and an input portion in the form of a small metal ball 66. The tube guide 62 has an elongated body portion 68 having a pair of depending support legs 70 at its opposite ends, and an arcuately cross-sectioned, longitudinally extending tube support channel 72 formed in its upper surface (as viewed in FIG. 5). At the opposite ends of the channel 72, the upper surface of the guide body 68 is downwardly tapered as indicated by the reference numerals 74. Tube restraining tabs 76 are mounted at the opposite ends of the guide body 68 and project upwardly past the opposite ends of the channel 72, each of the tabs 76 having a small opening 78 formed through its upper end. As will be seen, each of the sensors 60 senses translational movement of the ball 66 along a translational reference axis 80 of the sensor, the axis 80 extending parallel to the upwardly facing tube channel 72.

The flexible tube 64 has a central longitudinal section 82, and a pair of elongated, reduced diameter end portions 84 and 86. An inner lateral portion of the central tube section 82 (whole length is substantially equal to the distance between the tube guides 76) is received in the channel 72, with the reduced diameter end or output portions 84, 86 of the tube 64 extending outwardly through the openings 78 in the tabs 76. The tabs 76 prevent the central tube section 82 from moving along the channel 72 parallel to the translational reference axis 80. In a manner subsequently described, the opposite ends of each tube 64 is connected to the output system 16, thereby closing the ends of each tube.

Figure 4:
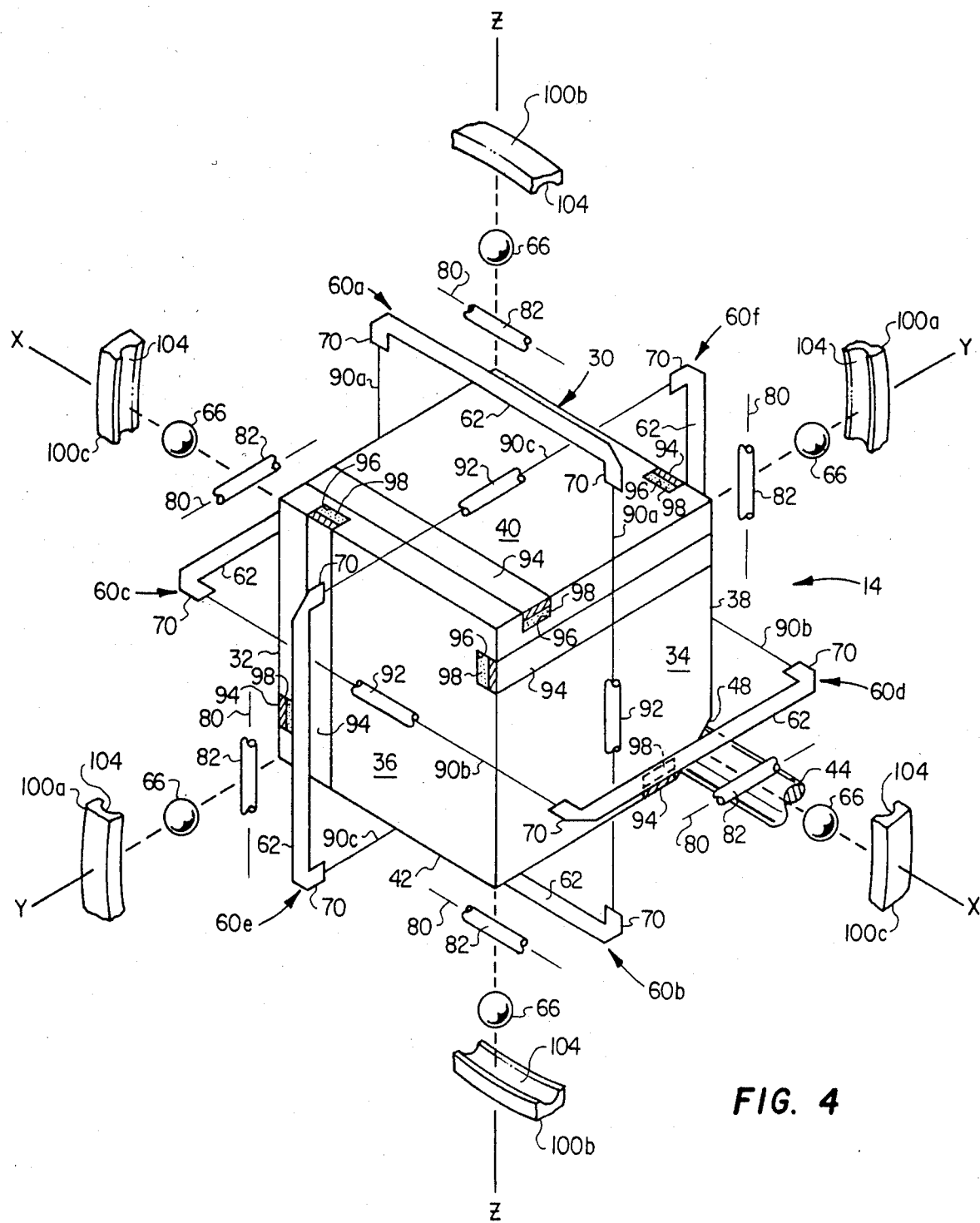
FIG. 4 is a partially exploded schematic perspective view of the internal motion-sensing system and adjacent sections of the spherical member which envelops it.

As best illustrated in FIG. 4, the translational motion sensors 60 are coupled in spaced pairs $60_a$ and $60_b$, $60_c$ and $60_d$, and $60_e$ and $60_f$ movable relative to the cube 30 by means of three parallel pairs $90_a$, $90_b$, $90_c$ of elongated metal support rods 90, each of the rods being circumscribed along its length by a teflon sleeve 92 which is rotatable relative to the rod. As illustrated in FIGS. 4 and 5, each pair of the support rods 90 is connected at its opposite ends to the tube guide support legs 70 of the motion sensors which it carries.

As best illustrated in FIG. 4, the support rod pair $90_a$ respectively positions the sensors $60_a$, $60_b$ outwardly of the cube side surfaces 40, 42 with the reference axes 80 of sensors $60_a$, $60_b$ extending parallel to the cube reference axis X—X. The support rod pair $90_b$ respectively positions the sensors $60_c$, $60_d$ outwardly of the cube side surfaces 32, 34 with the reference axes 80 of the sensors $60_c$, $60_d$ extending parallel to the cube reference axis Y—Y. Similarly, the support rod pair $90_c$ respectively positions the sensors $60_e$, $60_f$ outwardly of the cube side surfaces 36, 38 with the reference axes 80 of the sensors $60_e$, $60_f$ being parallel to the cube reference axis Z—Z.

While the lengths of the support rods 90 are longer than the width, depth or height of the cube 30, the lateral spacing between the rods in each pair thereof is such that the teflon-sleeved rods in each rod pair laterally engage opposite side surfaces of the cube 30, thereby permitting the teflon sleeves 92 to roll or slide along such opposite side surfaces. More specifically, the teflon sleeves 92 of the rods $90_a$ engage the cube side surfaces 32 and 34, the sleeves of rod pair $90_b$ engage the side surfaces 36 and 38, and the sleeves of rod pair $90_c$ engage the opposite cube side surfaces 40 and 42.

By means of this supporting arrangement, the cube 30 functions to decouple the sensor pairs $60_a$ and $60_b$, $60_c$ and $60_d$, and $60_e$ and $60_f$, permitting each sensor pair to move independently of the other two sensor pairs. However, each sensor pair is restrained by its interconnecting support rods from movement parallel to the reference axes 80 of such sensor pair. Specifically, the sensor pair $60_a$, $60_b$ is restrained against appreciable movement parallel to their axes 80 and the X-axis, but is movable parallel to the other two cube reference axes. Sensor pair $60_c$, $60_d$ is restrained against appreciable movement parallel to their axes 80 and the Y—Y axis, but is movable relative to the other two cube reference axes. Similarly, the sensor pair $60_e$, $60_f$ is restrained against appreciable movement parallel to their axes 80 and the reference axis Z—Z, but is movable parallel to the other two cube reference axes.

Wear-induced lateral play of the teflon-sleeved support rods 90 relative to the cube 30 is inhibited by six metal play control strips 94 movably received in outer portions of rectangularly cross-sectioned slots 96 formed along the six cube faces. Strips 94 are resiliently forced into engagement with the teflon rod sleeves 92 by means of resilient silicon strips 98 extending along the bottom of the slots 96.

Figure 2:
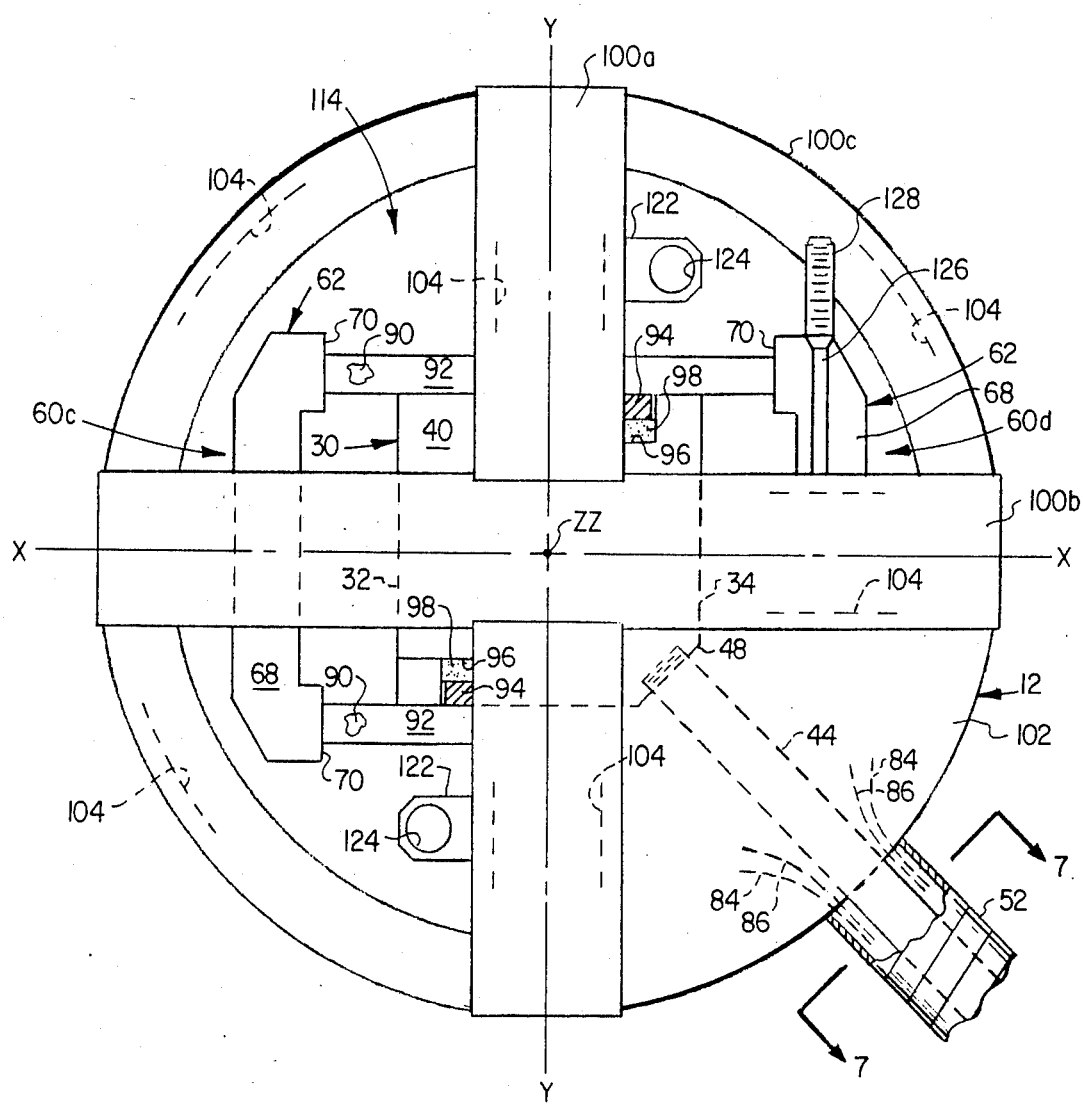
FIG. 2 is an enlarged scale top plan view of the spherical member with upper sections thereof being removed to reveal a motion-sensing system disposed therein, portions of such system being omitted for illustrative purposes.

Referring now to FIGS. 1 and 2, the spherical hand-held motion input member 12 is of a suitable plastic material, and is formed by interconnecting six semi-circular frame segments to form three interconnected circular frame members $100_a$, $100_b$, $100_c$ which, respectively coaxially circumscribe the cube reference axes X—X, Y—Y and Z—Z when the sphere is mounted on the cube 30. To complete the spherical member 12, suitably shaped plastic inserts 102 are used to cover the voids between the intersections of the sphere frame members.

Figure 3:
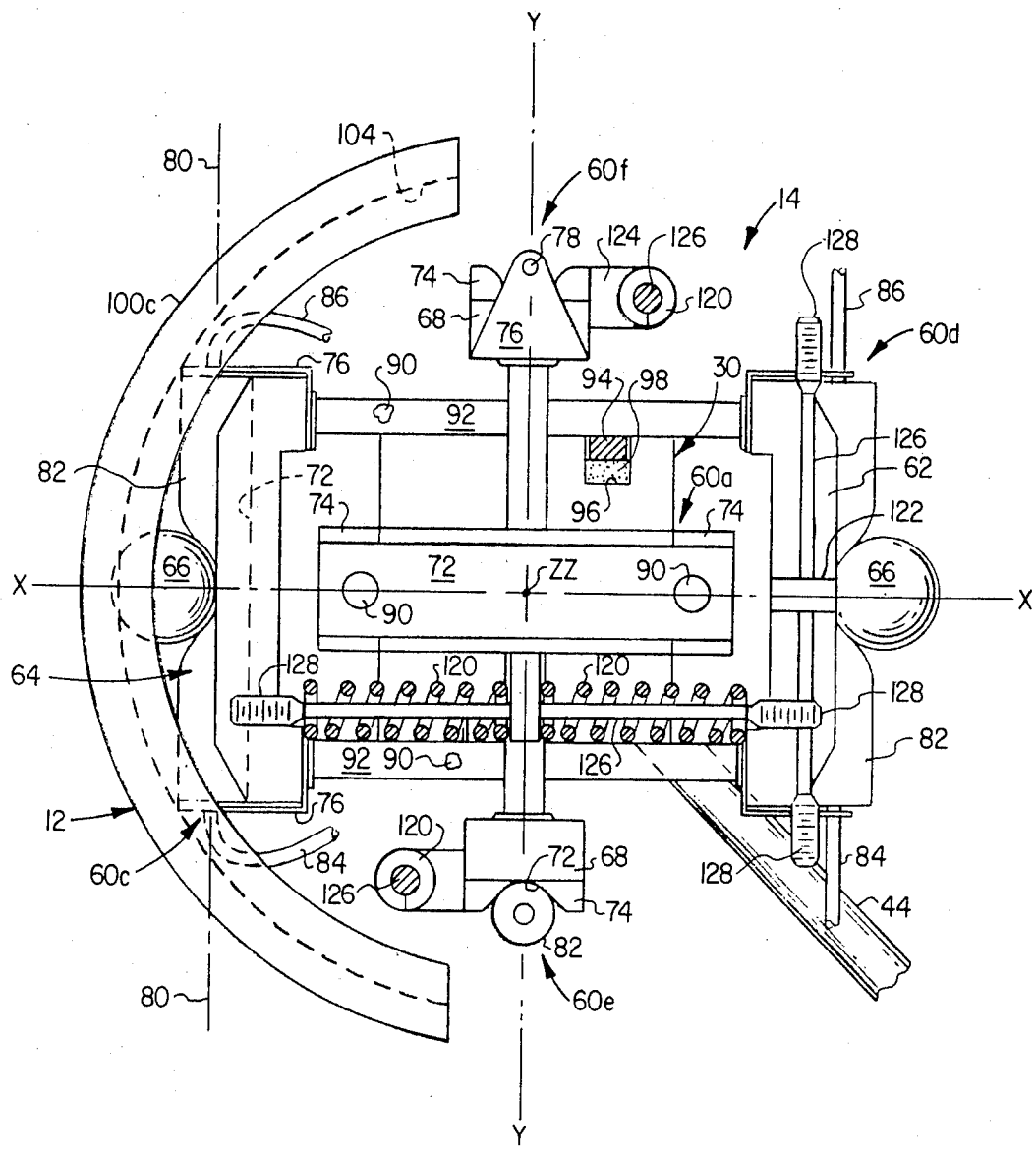
FIG. 3 is an enlarged scale cross-sectional view through the motion sensing system, and a segment of the spherical member, taken generally along line 3—3 of FIG. 2, portions of the motion-sensing system being deleted for illustrative purposes.

As illustrated in FIGS. 3, 4 and 5, each of the circular frame members $100_a$, $100_b$, $100_c$ of the sphere 12 has formed around its radially inner periphery an annular ball race or track 104, each of the races 104 carrying a diametrically opposed pair of the sensor balls 60. Each pair of balls 66 engages and completely pinches shut a longitudinally central portion of the central tube sections 82 of one of the pairs of motion sensors 60. Specifically, the pair of balls 66 carried by circular frame member $100_a$ pinch shut the central tube sections 82 of the motion sensors $60_e$ and $60_f$, the pair of balls 66 carried by circular frame member $100_b$ pinch shut the central tube sections 82 of sensors $60_a$ and $60_b$, and the pair of balls 66 carried by circular frame member $100_c$ pinch shut the central tube sections 82 of sensors $60_c$ and $60_d$.

The overall operation of the six-degree-of-freedom motion detecting system 10 will now be described in detail with particular reference to FIGS. 1, 3 and 4. In general, hand-generated motion of the spherical input member 12 relative to the rigidly supported internal cube 30 causes one or more of the sensor balls 66 to move longitudinally along their associated central tube sections 82 to thereby create pressure differentials in the tubes 64, such pressure differentials (which may be "positive", "negative", or of a zero value) being utilized in a subsequently described manner to generate the output signals 18, 20, 22, 24, 26 and 28 (FIG. 1).

To more specifically illustrate the operation of the motion detecting system 10, reference is now made to FIG. 3 in which the spherical member 12 is in a normally centered position relative to the cube 30 prior to movement of the sphere 12 by the hand of an operator. If the spherical member 12 is grasped and translated upwardly relative to cube 30 along axis Y—Y, the pair of balls 66 depicted in FIG. 3 will be rolled upwardly through equal distances along the central tube sections 82 of the sensors $60_c$ and $60_d$, thereby pinching such central tube sections 82 shut at higher locations thereon. This, in turn, will create in each of the sensors an internal pressure differential between its tube output portions 84 and 86, the outer ends of such portions 84, 86 being closed as previously mentioned. Such pressure differentials will be equal, with the pressure in tube portions 86 being higher than the pressures within tube portions 84.

Similarly, if the sphere 12 is translated downwardly along the Y—Y axis, the balls 66 will be rolled downwardly along the central tube sections 82 and pinch them completely shut at lower positions thereon. This will create equal pressure differentials between the tube output portions 84 and 86, but of an opposite "sense", the pressures in tube portions 84 being larger than the pressures in the tube portions 86.

If the sphere 12 is rotated in a clockwise direction around the Z—Z axis, the right ball 66 will be moved downwardly along the central tube section 82 of sensor $60_d$, and the left ball 66 will be moved upwardly along the central tube section 82 of sensor $60_c$. This opposite movement of the balls 66 creates between the tube portions 84, 86 equal pressure differentials of opposite senses. Specifically, the pressure within the tube section 86 of sensor $60_c$ will be higher than its corresponding tube section 84, while the pressure in tube section 84 of sensor $60_d$ will be higher than in its corresponding tube section 86. The senses of these two equal pressure differentials will, of course, be reversed if the sphere is rotated in a counterclockwise direction around the axis Z—Z to cause downward travel of the left ball 66 and upward travel of the right ball 66.

It will be appreciated that the sphere 12 may be simultaneously translated along the Y—Y axis and rotated about the Z—Z axis. However, whether the sphere is translated along the Y—Y axis, rotated around the Z—Z axis, or simultaneously translated and rotated relative to these two axes, the motion-induced pressure differentials generated in the two pairs 84, 86 of tube output portions are combinatively indicative above the magnitude and sense of the translation of the sphere parallel to the Y—Y axis, and of the magnitude and sense of the rotation of the sphere relative to the Z—Z axis. More specifically, the sum of such two pressure differentials is indicative of the Y—Y axis translation, while the difference of such two pressure differentials is indicative of Z—Z axis rotation.

While the foregoing operational description was directed only to sphere motion relative to the Y—Y and Z—Z axes, it will be appreciated that the other two sensor pairs $60_a$ and $60_b$, and $60_e$ and $60_f$, operate in an identical manner to generate pressure output signals (via their tube output portions 84, 86) which are combinatively indicative of spherical member translation and rotation relative to the reference axis sets X—X and Y—Y, and Z—Z and X—X.

It should be emphasized that while the six motion sensors 60 collectively generate pressure output signals (at least one of which will be a differential pressure having either a positive or negative "sense") which are combinatively indicative of sphere translation and rotation relative to all of the reference axes X—X, Y—Y and Z—Z, each of the sensors senses only translational motion of portions of the sphere (via balls 66) parallel to such three reference axes.

Figure 7:
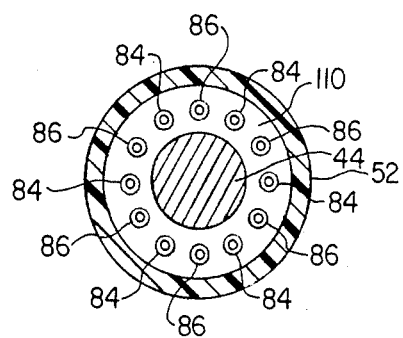
FIG. 7 is a cross-sectional view through a support shaft portion of the motion detection system, taken along line 7—7 of FIG. 2, and illustrates the routing of pressure output leads from the internal motion-sensing system.

Each of the output tube portion pairs 84, 86 is routed outwardly from the sphere 12 via an annular space 110 between the trim collar 52 and the support shaft 44 (FIG. 7) and through a suitable opening 112 formed in the base 50 (FIG. 1). The outer ends of each tube output portion pair 84, 86 are operatively connected to a different one of six differential pressure transducers (DPT's) 114. Each of the transducers 114 generates electrical differential signals $84_a$, $86_a$ which correspond to the pressure differential signals received thereby via the tube output portion pairs 84, 86. It will be appreciated that, depending on which balls are rolled in which direction, and how far each ball is rolled, each signal pair $84_a$, $84_b$ may represent a "positive" pressure differential of a given magnitude, a "negative" pressure differential of a given magnitude, or a "zero" pressure differential when the signal pair $84_a$ and $84_b$ are equal. The transducer output signals $84_a$, $86_a$ are transmitted to an electronic signal processor 116 which internally performs the necessary algebraic computations and responsively generates the translation and rotation-indicative output signals 18, 20, 22, 24, 26 and 28.

Referring now to FIGS. 3 and 5, when the spherical member 12 is not being used to input motion to the motion detecting system 10 (i.e., when the system operator releases the sphere 12), the sphere 12 is automatically re-centered relative to the decoupling cube 30 by means of six pairs of small helical centering springs 120, each spring pair being positioned adjacent one of the tube guides 62. Projecting laterally outwardly from a central longitudinal portion of each of the tube guide bodies 68 is a small centering tab 122 having an opening 124 formed therethrough. Each of the tab openings 124 movably receives a central portion of an elongated centering rod 126 which extends parallel to the tube guide body 68 and has threaded outer end portions 128. These threaded end portions are extending into suitable openings 130 formed in the sphere insert portions 102 and secured to the sphere by means of external nuts 132.

The centering springs 120 each circumscribe a longitudinal portion of the centering rod 126 disposed on opposite sides of the centering tab 122, each of the two springs 120 bearing at its inner end against the centering tab 122, and bearing at its outer end against the inner surface of one of the sphere insert portions 102. When the sphere 12 is moved relative to the internal cube 30, various of these centering springs 120 will be compressed. However, when the sphere is released each of the compressed springs 120 will resiliently return the sphere to its normally centered position relative to each of the three cube reference axes.

The re-centering forces of springs 120 are augmented by the pressure differentials created in the tubes 64 by the balls 66 which have been longitudinally shifted along their associated central tube sections 82. When the operator releases sphere 12, such pressure differentials act to re-center the shifted balls (and thus a portion of sphere 12) along their associated central tube sections.

It can be seen from the foregoing that the present invention uniquely provides a very compact six-degree-of-freedom motion detecting system in which each and every moving component of the motion-sensing system portion thereof is disposed and protected within the motion input member. The spherical input member may be easily and comfortably grasped by an operator, and requires only a very small amount of translation and/or rotation to automatically generate the six motion-indicative output signals from the system. The internal motion sensing system, while advantageously providing six degrees of motion input freedom, is formed from simple, relatively inexpensive, and highly reliable components which are easily manufactured.

It should readily be appreciated that the motion detection system of the present invention has a wide variety of potential uses. For example, the system could be used in the computer graphics area to perform three dimensional analysis, dynamic motion simulation or solids modeling functions. It could also be used to perform various computer-generated imaging and animation functions, as well as positioning apparatus for cameras, models, or lighting in film and studio applications. Similarly, the system of the present invention could be advantageously utilized in various robotics and industrial applications such as production control, tool path training, tool simulation/machine simulation, and in the control of "hands off" applications involving the handling of hazardous materials.

Figure 6:
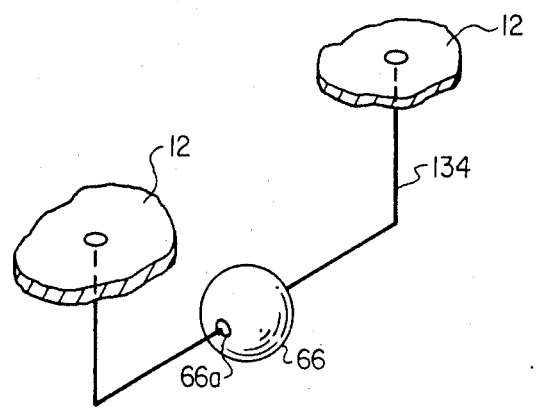
FIG. 6 is a schematic perspective illustration of an alternate method of supporting a rolling ball portion of the sensing system.

If desired, a variety of modifications could be made to the motion detecting system 10 described above. For example, the electronic signal output system 16 is merely representative of a variety of such systems which could be utilized to generate the motion-indicative output signals. Additionally, the sphere tracks 104 could be eliminated and the sensor balls 66 rotatably associated with the sphere in an alternate manner. For example, as depicted in FIG. 6, each of the balls 66 could be rotatably mounted on the sphere 12 by means of a generally U-shaped support pin 134 secured at its upper ends to the sphere 12 and extending at its lower end through a suitable opening $66_a$ formed axially through the ball. Moreover, the "fluid" with which each of the sensor tubes is filled is preferably air at ambient pressure. However, if desired, a suitable liquid (or other gas) could be utilized within the tubes, the term "fluid" as used herein meaning either liquid or gas.

The foregoing detailed description is to be clearly understood as given by way of illustration and example only, the spirit and scope of this invention being limited solely by the appended claims.

What is claimed is:

1. Apparatus for detecting translational and rotational movement of a body, comprising:
   (a) a plurality of flexible, fluid-filled tube means; and
   (b) means, responsive to motion of the body, for compressing said plurality of tube means at variable locations along their lengths to create therein pressure signals combinatively indicative of the magnitude and sense of translation and rotation of the body.

2. The apparatus of claim 1 further comprising means for utilizing said pressure signals to generate signals indicative of the magnitude and sense of translation and rotation of the body relative to three mutually perpendicular reference axes.

3. The apparatus of claim 1 wherein said means for compressing said tube means, and at least portions of said tube means, are disposed within the body.

4. Motion detecting apparatus comprising:
   (a) a first member;
   (b) a hollow second member enveloping said first member;
   (c) a plurality of flexible, fluid-filled conduits each having a central longitudinal section thereof disposed within said hollow second member; and
   (d) cooperating means on said first and second members for mounting said second member on said first member for translation and rotation relative thereto and, in response to relative motion between said first and second members, for creating in said conduits pressure signals combinatively indicative of the magnitude and sense of relative translation and rotation between said first and second members with respect to a plurality of non-parallel reference axes, at least one of said pressure signals being a differential pressure.

5. The apparatus of claim 4 wherein said pressure signals are combinatively indicative of the magnitude and sense of relative translation and rotation between said first and second members with respect to three non-parallel reference axes, and wherein said cooperating means include means for mounting each of said central longitudinal sections of said conduits on said first member for motion parallel to two of said reference axes, but precluding appreciable movement thereof parallel to the other of said reference axes.

6. The apparatus of claim 4 wherein said first member has a cubic configuration, said second member is spherical, and wherein said cooperating means include a plurality of balls carried by said second member for movement therewith and pinching shut said central longitudinal sections of said conduits at locations thereon which are varied by movement of said second member relative to said first member.

7. The apparatus of claim 4 further comprising means for automatically centering said second member relative to said first member in the absence of an external force applied to said second member.

8. Apparatus for detecting translation of a body relative to a first reference axis, and rotation of the body relative to a second reference axis, said apparatus comprising:
   (a) first and second translational motion sensor means for generating a duality of translation-indicative output signals, each of said first and second translational motion sensor means having an input portion movable relative to the balance thereof between first and second positions along a translational reference axis of the motion sensor means, said output signals being indicative of the magnitude and sense of translation of said input portions along said translational reference axes;
   (b) means for maintaining said translational reference axes of said first and second translational motion sensor means essentially parallel to said first reference axis;
   (c) means for connecting said input portions of said first and second translational motion sensor means to the body for movement therewith; and
   (d) means for converting said duality of translation-indicative output signals to signals indicative of the magnitude and sense of translation of the body relative to said first reference axis, and the magnitude and sense of rotation of the body relative to said second reference axis.

9. The apparatus of claim 8 wherein said first and second translational motion sensor means each include a flexible, fluid-filled tube, said input portion of each motion sensor is a ball rollable along the tube to pinch it shut in variable locations thereon in response to movement of the body, and at least one of said output signals is a pressure differential created in one of the tubes by one of the balls.

10. A method of detecting relative translational and rotational movement between two objects with respect to three mutually perpendicular reference axes, said method comprising the steps of:
    (a) interposing longitudinal portions of six flexible, fluid-filled conduits between the objects;
    (b) compressing the longitudinal conduit portions at variable locations thereon in response to relative motion between the two objects to create pressure signals in the conduits, at least one of said pressure signals being a differential pressure; and
    (c) utilizing the pressure signals to generate output signals indicative of the magnitude and sense of relative translation and rotation between the two objects with respect to the three mutually perpendicular reference axes.

11. The method of claim 10 wherein said interposing step includes arranging said longitudinal conduit portions in three mutually spaced pairs thereof so that the longitudinal conduit portions in each pair thereof are parallel to each other and extend parallel to a different one of said three mutually perpendicular reference axes.

12. The method of claim 11 wherein said compressing step is performed by rolling balls longitudinally along said longitudinal conduit portions to completely pinch them shut at variable locations thereon in response to relative motion between the two objects.

13. A motion detecting method comprising the steps of:
   (a) providing a hollow motion input member adapted to be translated and rotated relative to each of three non-parallel reference axes;
   (b) disposing within said motion input member motion sensing means for sensing only translational motion of portions of said motion input member parallel to each of the three reference axes; and
   (c) utilizing the motion sensing means to generate signals indicative of the magnitude and sense of both translation and rotation of the motion input member relative to each of the three reference axes.

14. A motion detecting method comprising the steps of:
   (a) providing a hollow motion input member adapted to be translated and rotated relative to each of three non-parallel reference axes;
   (b) disposing within said motion input member motion sensing means for sensing only translational motion of portions of said motion input member parallel to each of the three reference axes, said disposing step including disposing within said motion input member central longitudinal sections of six flexible, fluid filled tubes; and
   (c) utilizing the motion sensing means to generate signals indicative of the magnitude and sense of both translation and rotation of the motion input member relative to each of the three reference axes, said utilizing step including pinching the central longitudinal tube sections shut at variable locations along their lengths in response to translation and rotation of the motion input member.

15. The method of claim 14 wherein said disposing step includes the step of interposing rollable elements between the motion input member and the central longitudinal tube sections.

16. The method of claim 15 wherein said interposing step is performed by interposing balls between said central longitudinal tube sections and said motion input member.

17. A compact six-degree-of-freedom motion detecting system comprising:
   (a) a hollow spherical motion input member adapted to be conveniently grasped by an operator;
   (b) a decoupling cube disposed within said motion input member, said decoupling cube having three pairs of oppositely facing side surfaces and three mutually perpendicular reference axes, each of said reference axes extending transversely through a different one of said pairs of oppositely facing side surface of said decoupling cube;
   (c) a support member extending into said motion input member and being anchored at opposite ends to said decoupling cube and a rigid base;
   (d) three mutually spaced pairs of translational motion sensors disposed within said motion input member, the motion sensors in each pair thereof being spaced outwardly from two oppositely facing cube side surfaces, having translational reference axes parallel to the cube reference axis which transversely extends through such oppositely facing cube side surfaces, and input portions movable along their translational reference axes to generate output signals from the sensors which are indicative of the magnitude and sense of translation of the input portions, said input portions being connected to said motion input member for movement therewith;
   (e) three pairs of parallel, laterally spaced support rods disposed within said motion input member, each support rod pair being movably associated with two oppositely facing cube side surfaces and interconnecting one of said pairs of translational motion sensors, said support rod pairs preventing appreciable movement of their associated motion sensor pair parallel to the cube reference axis which is parallel to their translational reference axes, but permitting motion of their associated motion sensor pair parallel to the other two of said cube reference axes; and
   (f) an output system adapted to receive the output signals generated by said translational motion sensors and convert said output signals to signals indicative of the magnitude and sense of translation and rotation of said motion input member relative to said three mutually perpendicular reference axes of said decoupling cube.

18. The motion detecting system of claim 17 wherein each of said translational motion sensors includes a tube guide connected to two of said support rods, a flexible, fluid-filled tube having a central longitudinal section extending parallel to the sensor translational reference axis and carried by the tube guide, and wherein the input portion of each translational motion sensor is a ball which pinches the central longitudinal tube section shut and is carried by the motion input member for motion therewith to variably alter the pinched location of the central longitudinal tube section in response to movement of the motion input member.

19. The motion detecting system of claim 18 wherein said motion input member has internal tracks formed therein, and wherein said balls are operatively carried in said tracks.

20. The motion detecting system of claim 18 further comprising means for re-centering said motion input member relative to said decoupling cube when said motion input member is released by an operator thereof.

21. The motion detecting system of claim 20 wherein said re-centering means include spring means associated with each of said tube guides and internally bearing against said motion input member.

22. The motion detecting system of claim 20 wherein said re-centering means include said central longitudinal sections of said tubes.

23. The motion detecting system of claim 18 further comprising means for preventing appreciable motion of said central longitudinal tube sections relative to their associated tube guides in directions parallel to the sensor reference axes.

24. The motion detecting system of claim 23 wherein said motion-preventing means comprise restraining tabs positioned at opposite ends of said tube guides.

25. The motion detecting system of claim 18 wherein said output system comprises six differential pressure transducers each operatively coupled at their outlets to inlets of an electronic signal processor, and wherein the opposite end portions of each of said tubes are operatively connected to the inlets of one of said differential pressure transducers.

26. The motion detecting system of claim 17 further comprising means for inhibiting wear-induced lateral play between said support rod pairs and the oppositely facing cube side surfaces with which they are movably associated.

27. The motion detecting system of claim 26 wherein said play-inhibiting means include slots formed in said cube side surfaces, play control members movably positioned in outer portions of said slots, and resilient material disposed in said slots beneath said play control members and biasing said play control means outwardly toward said support rods.

* * * * *